United States Patent [19]

Ronzio et al.

[11] 3,991,156

[45] Nov. 9, 1976

[54] PROCESS FOR TREATING MOLYBDENITE CONCENTRATES TO PRODUCE A LUBRICANT GRADE PRODUCT

[75] Inventors: Richard A. Ronzio, Golden, Colo.; Joseph G. Brown, Norwalk, Conn.; Robert C. Ziegler, Golden, Colo.

[73] Assignee: Amax Inc., New York, N.Y.

[22] Filed: May 1, 1975

[21] Appl. No.: 573,542

[52] U.S. Cl. ................................ 423/53; 423/55; 423/561; 252/25
[51] Int. Cl.$^2$ .................................... C01G 39/00
[58] Field of Search ................. 423/53, 55, 561; 252/25

[56] References Cited
UNITED STATES PATENTS

| | | | |
|---|---|---|---|
| 3,101,252 | 8/1963 | Tschudi et al. | 423/53 |
| 3,117,860 | 1/1964 | Bjerkerud et al. | 423/53 |
| 3,661,508 | 5/1972 | Ritsko | 423/53 |

OTHER PUBLICATIONS

Bunge, "Chemical Abstracts," vol. 55, 1961, p. 2037h.

*Primary Examiner*—Herbert T. Carter
*Attorney, Agent, or Firm*—Harness, Dickey & Pierce

[57] ABSTRACT

A simple, efficient and economical process for purifying molybdenum disulfide concentrates by contacting and digesting the molybdenum disulfide feed material with an aqueous acid solution containing a controlled combination of hydrofluoric acid and sulfuric acid in a manner to convert substantially all of the contaminating silica bearing minerals therein to aqueous soluble fluoride and sulfate compounds and any contaminating lead sulfide compounds to lead sulfate compounds, and thereafter washing, neutralizing and drying the purified molybdenum disulfide powder product. In accordance with a preferred practice, when the molybdenum disulfide feed material contains in excess of about 0.1% iron as an indication of pyrite concentration, the concentrate is calcined at an elevated temperature in a nonoxidizing atmosphere prior to the digestion step to effect a conversion of the pyrites to synthetic pyrrhotites, which are softer and less abrasive and are more acid soluble. The product thus derived is eminently suitable for use in the formulation of lubricants and as an intermediate in the synthesis of high purity molybdenum compounds.

16 Claims, No Drawings

PROCESS FOR TREATING MOLYBDENITE CONCENTRATES TO PRODUCE A LUBRICANT GRADE PRODUCT

BACKGROUND OF THE INVENTION

The excellent lubricating properties of molybdenum disulfide as a dry lubricant as well as in the form of an additive in various oil and grease formulations has resulted in a widespread acceptance and commercial use of this material over a broad range of service conditions. Molybdenum disulfide powders of a so-called lubricant grade comprise finely-particulated high purity powders of an average particle size usually less than 20 microns to as small as a fraction of a micron and which contain less than about 0.5% of contaminating constituents consisting predominantly of silica and other gangue materials present in the ore body from which the molybdenite is derived.

A variety of physical and chemical processing techniques have heretofore been used or proposed for use for effecting a purification of technical grade concentrates of molybdenum disulfide to render the material suitable for use as a lubricant or as a high purity intermediate in synthesizing various molybdenum compounds and metallic molybdenum of corresponding high purity. Typical of such chemical purification processes heretofore proposed are those described in U.S. Pat. Nos. 2,686,156; 3,101,252 and 3,661,508. While the processes as disclosed in the aforementioned patents are effective to produce molybdenum disulfide powders of a desired purity, the processes are generally characterized as being of relatively high cost, relatively complex, requiring a substantial investment in processing equipment and facilities, requiring the use of substantial quantities of high cost chemical reagents, and/or requiring extensive waste treatment facilities for treatment of the waste streams in order that they can be harmlessly discharged into the atmosphere or to waste.

Physical purification techniques such as flotation techniques comprising a plurality of successive grinding, flotation and extraction operations to progressively reduce the quantity of contaminating constituents in the molybdenite concentrate, although costly, have been used for producing molybdenum disulfide powders of the requisite purity.

The process of the present invention overcomes the problems and disadvantages associated with prior art processing techniques by providing a simple, economical and efficient process for reducing silica and other gangue contaminating constituents present in molybdenite concentrates to within commercially acceptable levels. Additionally, the process of the present invention produces a relatively low volume of waste liquid streams which can be simply and effectively treated, whereby they can be harmlessly discharged to waste.

SUMMARY OF THE INVENTION

The benefits and advantages of the process comprising the present invention are achieved by providing a particulated molybdenite feed material preferably of a technical grade containing less than about 10% of silica and other acid insoluble contaminants and contacting and digesting the feed material with an aqueous acid solution containing a controlled combination of hydrofluoric acid and sulfuric acid. The concentration of the hydrofluoric acid in the aqueous acid solution is controlled so as to be at least stoichiometrically equal to that required for reaction with the quantity of silica present, while the sulfuric acid concentration is controlled so as to provide a pH of less than about 2. The single stage digestion of the feed material is accomplished by forming a slurry of the molybdenite feed material with the aqueous acid solution having a solids content usually ranging from about 10% to about 50% and the digestion step is carried out for a period of time sufficient to effect a conversion of the major portion of the contaminating silica constituent to aqueous soluble fluoride compounds and to effect a conversion of any lead compounds present to sulfate compounds.

At the completion of the digestion step, the particulated feed material is separated from the aqueous acid solution and is thereafter subjected to a plural washing treatment to remove the major portion of the retained or entrapped aqueous acid solution therein. Preferably, a portion of the aqueous acid solution is recovered and recycled to the digestion step for admixture with fresh make-up acid solution, while the balance is transferred to waste disposal treatment systems to effect a precipitation of the solubilized contaminating constituents therein. The resultant washed and purified molybdenum disulfide powder is neutralized, such as by contact with a dilute alkaline solution to neutralize any residual acid therein, whereafter the powder is dried providing a high purity molybdenum disulfide product having a residual acid insoluble content below about 0.35% to as low as 0.1% or even less in many instances.

When molybdenite feed materials contain in excess of about 0.1% iron, which is indicative of the concentration of iron pyrite as a contaminating constituent, it is preferred, prior to the digestion step, to calcine the feed material at a temperature above about 650° C up to a temperature below the incipient melting point of molybdenum disulfide (1185° C) for a period of time sufficient to convert the predominant portion of pyrite to pyrrhotite, which is softer and less abrasive and also is more soluble in the aqueous acid digesting solution. Particularly satisfactory results are obtained employing a calcination temperature of about 650° C up to about 800° C employing a nitrogen atmosphere and a dwell period of about one to about two hours at temperature.

Additional benefits and advantages of the present invention will become apparent upon a reading of the description of the preferred embodiments, taken in conjunction with the specific examples provided.

DESCRIPTION OF THE PREFERRED EMBODIMENTS

It will be understood that the compositions of the feed material, purified product, solutions and reagents employed are expressed in the specification and subjoined claims in terms of percentage by weight unless clearly indicated to the contrary.

The molybdenite feed material may comprise any particulated concentrate composed predominantly of molybdenum disulfide derived from any one of a number of commercial sources. Most commonly, the molybdenite feed material comprises a concentrate derived from various ore beneficiation processes which are effective to reduce the gangue and other contaminating substances in the concentrate to levels below about 10%. The principal source of molybdenite is at Climax, Colorado, where molybdenite ($MoS_2$) is found in an ore body comprised of a highly silicified and altered granite through which the molybdenite is distributed in the form of very fine-sized veinlets. The concentration of the molybdenite in the ore, as mined, is generally in the order of about 0.3% to about 0.6%, and this concentration is increased through various beneficiation processes, such as an oil flotation extraction process, to increase the concentration of molybdenum disulfide to levels in excess of 60%, and more usually to levels of 90% and greater.

The oil flotation extraction process conventionally employs pine oil and petroleum oil in combination with suitable wetting agents to effect a separation of the molybdenite constituent in the ore from the gangue, which consists predominantly of silica and lesser amounts of silicate and pyrites. The silica, silicates, pyrites and other contaminating gangue constituents in the molybdenite concentrate are hereinafter collectively referred to as silica and is normally identified as that portion insoluble in nitric acid and perchloric acids and soluble in hydrofluoric acid. It has heretofore been possible, by subjecting the ore to repeated grinding and oil flotation extraction operations, to effect a progressive reduction in the quantity of the gangue or silica constituent remaining in the concentrate to levels as low as about 0.35% in order to produce a resultant product which is of a so-called lubricant grade. Although the costs associated with the purification of concentrates by oil flotation extraction operations to reduce the silica below 0.35% are relatively high, the process has been satisfactorily employed for meeting the commercial demand for lubricant grade molybdenum disulfide products.

More usually, the oil flotation extraction process or other ore beneficiation process is carried out to reduce the silica constituent thereof to a level of about 10% to about 5% which corresponds to a technical grade concentrate which is particularly suitable for use as a feed material in the practice of the present process. It will be understood that while molybdenite feed materials containing less than about 10% of silica and other gangue constituents are preferably employed in the practice of the present invention, any molybdenite concentrate in particulated form comprised predominantly of molybdenite can also be used.

The particle size of the feed material is not critical, although particle size does influence the retention time of the feed material in the acid digestion step. Normally, molybdenite concentrates derived from the oil flotation extraction process are of an average particle size usually less than about 150 microns to as small as about 10 microns. Molybdenite concentrates derived from such oil flotation beneficiation processes are further characterized as comprising wet oily masses usually containing up to about 20% water and up to about 7% residual flotation oils. The oily substance in the concentrate may comprise any one of a variety of hydrocarbon substances which adsorb on the molybdenum disulfide powder and may comprise a mixture of vegetable or petroleum oils, or other oily substances such as disclosed in U.S. Pat. No. 2,686,156, which are satisfactory for use in oil flotation operations. It is not necessary in the practice of the present invention to first remove such contaminating oily substances that may be present in molybdenite feed materials before they are contacted with and digested by the aqueous acid solution.

When the molybdenite feed material contains iron in an amount greater than about 0.1% by weight, which is indicative of the concentration of iron pyrite in the concentrate, it is usually preferred, in order to improve the lubricity characteristics of the resultant purified molybdenum disulfide, to first subject the concentrate to a calcining operation at elevated temperature in a manner so as to convert the comparatively abrasive iron pyrite constituents to a synthetic type pyrrhotite, which is substantially less abrasive and also is more susceptible to dissolution in the aqueous acid digesting solution. In accordance with this discovery, the abrasive iron pyrite ($FeS_2$) which registers 6.5 on the Mohs scale of hardness is converted into a synthetic pyrrhotite ($FeS_{1+x}$) which registers about 3.5 on the Mohs scale and is also more soluble in the aqueous acid solution, thereby effecting a further purification of the concentrate during the acid digesting step.

The calcining operation is carried out in a nonoxidizing atmosphere at a temperature of at least about 650° C up to a temperature below that at which incipient melting of the molybdenum disulfide occurs, which has a melting point of 1185° C. Preferably, the temperature is controlled during the calcining step from between about 650° C up to about 800° C. The nonoxidizing atmosphere is employed to prevent oxidation of the molybdenum disulfide constituent to molybdenum oxide and may comprise any gaseous atmosphere, including nonoxidizing as well as inert atmospheres such as, for example, argon, carbon dioxide and nitrogen, of which the latter constitutes a preferred atmosphere. The duration of the calcining step will vary depending on the concentration of pyrites present in the feed material, as well as the specific temperature employed, with the residence time decreasing as the calcining temperature increases. Ordinarily, retention times of the feed material for a period of from one to about two hours at a temperature of from about 650° C to about 800° C is effective to convert substantially all of the pyrite to pyrrhotite. The calcining step also removes any contaminating oily substances present in the feed material due to the volatilization and/or thermal decomposition thereof.

The aqueous acid solution employed for leaching or digesting the feed material contains a mixture of hydrofluoric acid and sulfuric acid in controlled amounts which are effective to convert the silica constituent in the feed material to soluble fluoride compounds. The quantity of active hydrofluoric acid present in the aqueous acid solution is determined by the quantity of silica present in the feed material. The quantity of hydrofluoric acid is controlled to be present in an amount at least stoichiometrically equal to the amount of silica present in the feed material to convert the silica and quartz to aqueous acid soluble fluoride compounds in accordance with the general reaction equation as set forth below:

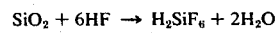
$$SiO_2 + 6HF \rightarrow H_2SiF_6 + 2H_2O$$

Preferably, the concentration of hydrofluoric acid is controlled slightly in excess of that stoichiometrically required, with an amount in excess of about 15% being particularly satisfactory. Quantities of hydrofluoric acid above about 15% in excess of that stoichiometrically required do not provide any appreciable benefits in the practice of the purification process and are undesirable from an economic standpoint, as well as aggravating the waste disposal treatment problem.

The quantity of sulfuric acid present in the aqueous acid solution is controlled so as to provide a pH of the reaction medium below about 2, and which may range as low as about pH 0. In addition to serving as a pH control of the reaction medium, the sulfuric acid constituent is also effective with hydrofluoric acid to react with other contaminating metal constituents, particularly lead compounds such as lead sulfide to effect a conversion thereof to sulfate salts, such as lead sulfate. The reduction of the contaminating lead constituents in the feed material as a result of acid leaching comprises a further benefit of the present invention. The particular ratio of hydrofluoric acid and sulfuric acid and the concentrations employed in the aqueous acid solution will vary depending upon the quantity of silica present in the feed material, the solids content of the feed material in the slurry formed and the specific pH of the reaction medium within the permissible range of pH 0 to pH 2.

The acid leaching or digestion of the feed material with the aqueous acid solution is achieved by forming a slurry which preferably has a solids content of about 10% to about 50%. The slurry is subjected to agitation to maintain the particles suspended and in intimate contact with the active acid constituents in the acid solution. The temperature of the slurry during the digestion step can range from ambient temperature (20° C) up to a temperature below that at which an appreciable volatilization of the hydrofluoric acid constituent occurs. Particularly satisfactory results are achieved by employing temperatures ranging from about 50° C up to about 90° C. The digestion step is carried out for a period of time sufficient to effect a conversion of the major portion of the contaminating silica constituent in the feed material to soluble fluoride compounds, as well as to convert any lead sulfide compounds present in the feed to lead sulfate compounds. Ordinarily, periods ranging from about 8 hours up to about 24 hours are sufficient to effect a purification of technical grade concentrates to an extent that the acid insoluble constituents remaining therein are below 0.35%. Correspondingly shorter or longer times can be employed to achieve the desired degree of purification in consideration of such factors as the concentration of contaminating constituents in the original feed material, the temperature of the aqueous acid solution, the magnitude of excess hydrofluoric acid present, the pH of the slurry during the digestion step, etc.

At the conclusion of the digestion step, the purified feed material is recovered from the aqueous acid solution such as by decantation, centrifuging or filtration. According to a preferred practice of the present invention, a portion generally ranging from zero up to about 10% of the aqueous acid solution recovered is recycled to the digestion step for admixture with a solution containing fresh make-up hydrofluoric acid and sulfuric acid to adjust the concentration of the two acid constituents within the parameters as previously described. The balance of the spent aqueous acid solution recovered is subjected to waste treatment, whereafter it is harmlessly discharged to waste. The waste aqueous acid solution containing residual hydrofluoric acid, sulfuric acid and fluosilicic acid, as well as salts thereof, are readily treated by the addition of lime, lime-alum, lime-carbon dioxide, or the like, to effect a precipitation and removal of these dissolved constituents by settling in a tailings pond and the aqueous solution thereafter can be harmlessly discharged to waste.

The purified molybdenite feed material recovered from the digestion step is next subjected to a hot water wash treatment for effecting a removal of the residual acid constituents and reaction products entrained or entrapped therewithin, followed by a final potassium hydroxide neutralizing wash treatment. The wash treatments are carried out preferably by slurrying the purified feed material in water at solid contents of about 10% to about 50%, and thereafter recovering the washed feed material such as by decantation, centrifuging, filtration, or the like.

The purified and washed feed material retains a small residual portion of acidic constituents which can readily be neutralized to provide a substantially neutral powdered product by contacting the washed and purified feed material with an alkaline material so as to provide a residual pH of about 6 to about 8. Preferably, the neutralization step is carried out by slurrying the feed material with a dilute aqueous alkaline solution at a solids content of about 10% to about 50% containing alkaline agents selected from the group consisting of sodium hydroxide, potassium hydroxide, sodium carbonate, potassium carbonate, ammonium hydroxide, or the like, as well as mixtures thereof, of which potassium hydroxide comprises the preferred material.

Ordinarily the concentration of the alkaline agent, such as potassium hydroxide, in the aqueous neutralizing solution may range from about one-half to about 1%. In addition to effecting a neutralization of residual acid constituents, the use of potassium hydroxide is also effective to some extent in solubilizing any molybdenum oxides present in the purified feed material, forming aqueous soluble potassium molybdate compounds which are extracted, providing for a still further purification of the molybdenite product. The recovery of the neutralized purified product is also achieved by decantation, centrifuging or filtration, and all or portions of the aqueous alkaline solution can be recovered for reuse in subsequent neutralization steps. If desired, the recovered neutralized powder product can be subjected to a further wash treatment in a manner as previously described to remove any residual neutralizing solution entrapped therein. The resultant wet purified powder product is dried, preferably at an elevated temperature such as 100° C, to remove substantially all of the residual water therefrom employing any one of a variety of drying techniques which minimizes oxidation of the molybdenum disulfide.

The resultant dried product contains less than 0.35% acid insolubles to as little as 0.1% or less, depending upon the processing variables employed in the purification process. By employing the preferred conditions as hereinbefore set forth, acid insolubles as low as about 0.02% can readily be obtained, which includes not only the residual silica present in the original feed material, but also minimal amounts of other contaminants such as topaz and alumina introduced into the feed material as a result of attrition of the grinding medium employed in pulverizing the feed material preliminary to the purification process.

In order to further illustrate the purification process comprising the present invention, the following specific examples are provided. It will be understood that the examples are provided for illustrative purposes and are not intended to be limiting of the scope of the invention as herein described and as set forth in the subjoined claims.

EXAMPLE 1

A 200 gram sample of a particulated lubricant grade molybdenite concentrate containing 0.314% acid insolubles and 0.024% molybdenum oxide compounds having an average particle size of about 37 microns is slurried at a solids content of 30.5% in an aqueous acid solution comprised of 450 grams of a 30% sulfuric acid solution and 6.1 grams of a 49% hydrofluoric acid solution. The acid solution is maintained at a temperature of about 50° C and digestion of the feed material is continued for a period of 8 hours under constant agitation. At the completion of the digestion step, the slurry is filtered, washed with hot water, neutralized with a dilute potassium hydroxide wash solution, and the filtrate is permitted to settle and the supernatant liquid is decanted and discarded. The cake is dried at 100° C and packaged.

Analysis of the purified product reveals a recovery of 197 grams product having an acid insoluble content of only 0.019% and only 0.016% molybdenum oxide compounds. This corresponds to a 93.9% removal of the original acid insolubles by the purification process.

EXAMPLE 2

A 100 gram sample of the same feed material as employed in Example 1 is admixed with an aqueous acid solution comprised of 225 grams of 30% sulfuric acid and 3.05 grams of 49% hydrofluoric acid, forming a slurry having a solids content of 30.5%. The digestion step is carried out in an 800 milliliter beaker having an inside diameter of 3.75 inches (95.5 mm) employing a stirrer, with the temperature of the acid solution maintained at ambient temperature. After a 24 hour digestion period, the purified feed material is extracted by filtration and washed three times with water employing 200 milliliters in each wash step, followed by a dilute potassium hydroxide neutralization treatment employing a dilute potassium hydroxide solution of a pH 8.5, whereafter it is filtered and washed once more with water in a manner as previously described in Example 1. The resultant purified feed material is dried at 100° C and is analyzed and found to contain 0.064% acid insolubles, representing a removal of about 80% of the original insoluble content.

EXAMPLE 3

The same feed material as previously employed in Examples 1 and 2 is purified by forming a slurry containing 450 grams of feed material in an aqueous acid solution comprised of 11.6 grams of a 49% hydrofluoric acid solution and 436.4 grams of a 30% sulfuric acid solution. The percent solids in the slurry is about 50%. The digestion of the feed material is carried out in two stages, including a first stage at which the aqueous acid solution is maintained at 50° C for a duration of eight hours, and a second stage at ambient temperature for a duration of sixteen hours. The resultant slurry is thereafter diluted to a solids content of 36% with water, and the resultant product recovered by filtration. An analysis of the purified molybdenum disulfide powder product reveals a residual acid insoluble content of 0.019%.

EXAMPLE 4

A molybdenite concentrate feed material containing 0.37% acid insolubles is purified by slurrying 500 grams of the concentrate with an aqueous acid solution comprised of 15.25 grams of a 49% solution of hydrofluoric acid and 1000 grams of a 30% sulfuric acid solution. The digestion step is carried out at ambient temperature for a period of 24 hours at a percent solids of 30%. The resultant digested feed material is diluted with water to a 10% solids concentration, is filtered and washed twice with water at a slurry solids concentration of 10%. The washed product is subsequently recovered by filtration and neutralized with a 10% aqueous potassium hydroxide solution. The resultant purified product, after drying, is analyzed and found to contain 0.06% acid insolubles.

EXAMPLE 5

A 100 gram sample of a molybdenite concentrate feed material containing 0.3% acid insolubles is digested by forming a slurry with an aqueous acid solution containing 3.05 grams of a 49% hydrofluoric acid solution and 225 grams of a 30% sulfuric acid solution. The digestion is carried out for a period of 24 hours at ambient temperature at a solids content of 30.5%. At the completion of the digestion step, the slurry is diluted with water to a 3% solids concentration and the solid material recovered by filtration, washing and neutralization with a dilute potassium hydroxide solution. The washed solid product is dried at 100° C. The resultant purified product is analyzed and found to contain 0.04% acid insolubles.

EXAMPLE 6

A 200 gram sample of a molybdenite concentrate feed material containing 5.0% acid insolubles is digested by forming a slurry with an aqueous 5% sulfuric acid solution containing 81.4 grams of a 49% hydrofluoric acid solution. The digestion is carried out for a period of six hours at 70° C at a solids content of 50%. At the completion of the digestion step, the solid material is recovered by filtration, washing, neutralization with potassium hydroxide solution, washing and filtering. The leached and washed product is dried at 100° C. The resultant purified product is analyzed and found to contain 0.08% acid insolubles.

EXAMPLE 7

A sample of molybdenite concentrate is roasted for one hour at 650° C in a nitrogen atmosphere and cooled to room temperature under nitrogen. A sample of the roasted molybdenite concentrate containing 5.0% acid insoluble and 0.20% Fe is digested by forming a slurry with an aqueous 30% sulfuric acid solution containing three times the stoichiometric amount of hydrofluoric acid to react with the silica in the feed sample. The digestion is carried out for a period of 8 hours at 70° C at a solids content of 30%. At the completion of the digestion step, the solid material is recovered by filtration, washing, neutralizing with KOH solution, washing and filtering. The leached and washed solid product is dried at 100° C. The resultant purified product is analyzed and found to contain 0.08% acid insolubles and 0.075% Fe, and produces lubricity characteristics superior to a lubricant grade molybdenum disulfide made by conventional grinding and flotation extraction operations.

EXAMPLE 8

A sample of molybdenite concentrate is roasted for 1 hour at 650° C in a nitrogen atmosphere and cooled to room temperature under nitrogen. A 100 gram sample of the roasted molybdenite concentrate containing 0.26% acid insolubles and 0.10% Fe is digested by forming a slurry with an aqueous 5% sulfuric acid solution containing 4.0 grams of a 49% hydrofluoric acid solution. The digestion is carried out for a period of eight hours at 70° C at a solids content of 50%. At the completion of the digestion step, the solid material is recovered by filtration, washing, neutralizing with KOH solution, washing and filtering. The leached and washed solid product is dried at 100° C. The resultant purified product is analyzed and found to contain 0.044% acid insolubles and 0.060% Fe.

While it will be apparent that the invention herein disclosed is well calculated to achieve the benefits and advantages set forth above, it will be appreciated that the invention is susceptible to modification, variation and change without departing from the spirit thereof.

What is claimed is:

1. A process for producing a high purity molybdenum disulfide powder suitable for use as a lubricant which comprises the steps of providing a particulated impure molybdenite feed material containing up to about 10% silica as a contaminant and of an average particle size less than about 150 microns, contacting said feed material with an aqueous acid solution containing hydrofluoric acid in an amount at least stoichiometrically equal to that required for reaction with the amount of silica present in said feed material and sulfuric acid in an amount to provide a pH of less than about 2 to about zero, digesting said feed material with said aqueous acid solution at a solids concentration of about 10% to about 50% for a period of time to convert the major portion of the contaminating silica in said feed material to aqueous soluble fluoride compounds, separating and recovering the digested said feed material from said aqueous acid solution, washing the recovered said feed material with water to remove the major portion of the retained said aqueous acid solution, and thereafter neutralizing and drying the washed and purified said feed material to provide a high purity molybdenum disulfide powder product.

2. The process as defined in claim 1, in which said feed material contains up to about 1% silica.

3. The process as defined in claim 1, in which said feed material contains up to about 0.5% silica.

4. The process as defined in claim 1, wherein said step of digesting said feed material with said aqueous acid solution is performed at a temperature ranging from about 60° C to about 90° C.

5. The process as defined in claim 1, in which the amount of said hydrofluoric acid in said aqueous acid solution ranges up to about 15% in excess of the amount stoichiometrically required.

6. The process as defined in claim 1, in which the step of separating and recovering the digested said feed material includes the further step of recovering and recycling a portion of said aqueous acid solution for reuse in the digesting step.

7. The process as defined in claim 1, in which the step of washing the recovered said feed material comprises a plurality of individual separate wash steps.

8. The process as defined in claim 1, in which the step of washing the recovered said feed material comprises from three to five individual separate wash steps.

9. The process as defined in claim 1, in which the step of neutralizing the washed said feed material is performed by contacting said feed material with a dilute aqueous alkaline solution containing an alkaline agent selected from the group consisting of ammonium hydroxide, sodium carbonate, potassium carbonate, sodium hydroxide, potassium hydroxide and mixtures thereof.

10. The process as defined in claim 1, in which the step of neutralizing the washed said feed material is performed by contacting said feed material with a dilute aqueous potassium hydroxide solution containing from about 0.5% to about 1% potassium hydroxide.

11. The process as defined in claim 1, wherein said high purity molybdenum disulfide powder product contains less than about 0.5% acid insoluble contaminants.

12. The process as defined in claim 1, in which the step of separating and recovering the digested said feed material includes the further step of recovering and treating at least a portion of said aqueous acid solution to effect a precipitation and removal of the harmful solubilized constituents therein to enable a harmless discharge of the treated said solution to waste.

13. The process as defined in claim 1, including the further step of calcining said molybdenite feed material prior to contact with said aqueous acid solution by heating said feed material to an elevated temperature between about 650° C up to a temperature below the incipient melting temperature of molybdenum disulfide in a nonoxidizing atmosphere for a period of time sufficient to cause a predominant portion of the iron pyrite present in the feed material to convert to pyrrhotite.

14. The process as defined in claim 13, wherein the feed material is heated during the calcining step to a temperature ranging from about 650° C to about 800° C.

15. The process as defined in claim 13, in which the calcining step is carried out in an inert atmosphere.

16. The process as defined in claim 13, wherein said nonoxidizing atmosphere comprises nitrogen.

* * * * *